April 10, 1951 C. C. MINTER 2,548,550
HYGROMETER
Filed Oct. 4, 1944 3 Sheets-Sheet 1

INVENTOR
CLARKE C. MINTER.
BY
ATTORNEY

April 10, 1951

C. C. MINTER 2,548,550

HYGROMETER

Filed Oct. 4, 1944

INVENTOR
CLARKE C. MINTER.
BY
ATTORNEY

April 10, 1951 C. C. MINTER 2,548,550
HYGROMETER

Filed Oct. 4, 1944 3 Sheets-Sheet 3

INVENTOR
CLARKE C. MINTER.
BY
ATTORNEY

Patented Apr. 10, 1951

2,548,550

UNITED STATES PATENT OFFICE 2,548,550

HYGROMETER

Clarke C. Minter, East Orange, N. J.

Application October 4, 1944, Serial No. 557,130

9 Claims. (Cl. 73—388)

The present invention relates to measuring apparatus and more particularly to hygrometers operating on the psychrometric principle to give a direct reading of the relative humidity regardless of the temperature of the atmosphere.

Hygrometers of several types are known to the art but the only type heretofore known for giving a direct reading is the hair-hygrometer which is very fragile and unreliable. Another type equally well known is the wet and dry bulb hygrometer which is much more accurate than the hair-hygrometer but which is subject to the disadvantage that it is not direct reading. Consequently humidity reading has to be determined from empirical tables or charts based on temperatures of the wet bulb and the dry bulb with the difference therebetween empirically establishing psychrometric tables corresponding to readings of relative humidity.

Attempts have been made to produce a direct reading hygrometer operating on the psychrometric principle utilizing the temperature difference between a wet bulb and a dry bulb, but these have proven unsatisfactory and unreliable because they fail to take into account and compensate for certain basic principles. For example, extensive experiments with the wet and dry bulb hygrometer have shown that the difference in temperature between the wet bulb and the dry bulb varies from zero at 100% relative humidity to a maximum at zero humidity and that this maximum difference at zero humidity, or any other humidity, increases as the temperature of the air, indicated by the dry bulb, increases. However, an analysis of the psychrometric tables fails to reveal any obvious workable relation between the lowering of the temperature of the wet bulb at a given humidity and the temperature of the dry bulb in order that a direct-reading hygrometer can readily be designed to take into account such relation.

Appreciating the difficulty a direct-reading hygrometer operable on the psychrometric principle has been suggested wherein the relation between the dry bulb temperature, the relative humidity, and the psychrometric difference in temperature between wet and dry bulb is expressed by a quadratic equation. I have found, however, that such a quadratic relation is not necessary because the psychrometric difference in temperature increases more or less linearly with temperature, except at very low humidity and very high temperature, conditions very rare in the inhabited areas of the world.

It is accordingly an object of the present invention to provide a direct-reading hygrometer operable on the psychrometric principle wherein the accuracy between a wet and dry bulb is utilized.

Another object of the present invention is the provision of a hygrometer for directly reading the concentration of flammable or poisonous vapors of a volatile liquid in a body of gas, such as the atmosphere in an industrial plant or the like, and wherein the wet bulb of the hygrometer is surrounded by a film of a volatile liquid other than water.

Another object of the present invention is to provide a hygrometer operable on the psychrometric principle wherein quantitative mechanical forces or displacements are employed and which are produced in proportion to concentrations of vapor of a volatile liquid in a body of gas with such forces directly operating a ratio meter to give an indication of humidity or vapor concentration.

Still further objects of the present invention will become obvious to those skilled in the art by reference to the accompanying drawings wherein.

Figure 1:
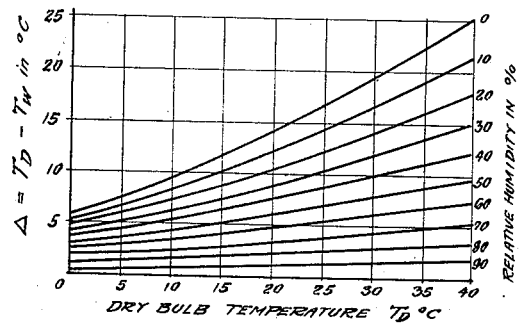
Figure 1 is a graphic illustration of how the psychrometric difference between the temperature of a wet and dry bulb for a given humidity varies with changes in ambient temperature.

Before describing in detail the various modifications of the hygrometer of the present invention as shown in the drawings, it is believed desirable to again mention that the difference in temperature between the wet bulb and dry bulb varies from zero at 100% relative humidity to a maximum at zero humidity and that this maximum difference at zero humidity increases as the temperature of the dry bulb increases. It is this relationship which heretofore has constituted the greatest problem and so far as I am aware has not been properly considered in the production of an accurate direct reading hygrometer.

In my solution of the problem and because of the interpolations and extrapolations necessary in constructing a usable psychrometric table on which to base the design of an accurate direct-reading hygrometer, I find it expedient to employ a theoretical relation to calculate the difference in temperature between the wet bulb and the dry bulb as the relative humidity and the ambient temperature are varied. The relation I employ is:

(A)
$$T_d - T_w = \Delta$$
$$\Delta = \frac{K(P_{T_w} - HP_{T_d})}{B}$$

in which:

$T_d$=dry bulb temperature
$T_w$=wet bulb temperature
$\Delta$=psychrometric difference
$P_{T_w}$=vapor pressure of water at temperature of wet bulb
$P_{T_d}$=vapor pressure of water at temperature of dry bulb
$H$=relative humidity
$B$=barometric pressure
$K$=a constant of proportionality (taken from experimental data)

As will be hereinafter pointed out Equation A yields much more accurate results than are possible with any quadratic equation heretofore utilized and such results are much more useful than an experimental psychrometric table.

Figure 2:
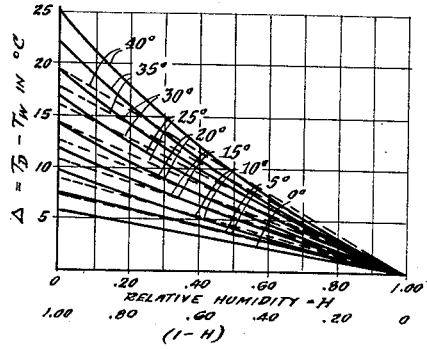
Figure 2 is a graphic illustration showing how the psychrometric difference between the temperature of a wet bulb and a dry bulb varies with humidity at a given temperature.

Referring now particularly to Fig. 1, wherein the abscissa represents the temperature of the dry bulb $T_d$ in ° C. and the ordinate the psychrometric difference or $\Delta$, it will be readily seen how $\Delta$ for a given humidity varies with temperature, and in Fig. 2 how $\Delta$ varies with humidity for a given temperature. Yet it is these values of $\Delta$ which must be employed to operate a direct-reading hygrometer, and since the magnitude of $\Delta$ for a given humidity increases with temperature, as shown in Fig. 1, it would clearly be impossible to obtain an accurate indication of the humidity by means of a fixed scale and a $\Delta$-operated pointer, without providing some means for automatically compensating for the effect of temperature on $\Delta$ for a given humidity.

By reference now to Fig. 2 wherein the ordinate again represents $\Delta$ and the abscissa relative humidity H, it will be noted that various curves have been drawn wherein the dashed lines depict the relationship between the lowering of the temperature of the wet and dry bulb and the relative humidity from 0° to 40° C. These dashed lines have been calculated by means of an empirical relation:

(B)
$$\Delta_0 = K\left(T + \frac{A}{B}\right)$$
$$\Delta_H = K\left(T + \frac{A}{B}\right)(1-H)$$

wherein $\Delta_0$=psychrometric difference at zero humidity
$\Delta_H$=psychrometric difference at any other humidity
A—B—K=constants
T=temperature
H=relative humidity If it be assumed that this equation expresses the relationship between lowering of wet and dry bulb temperature and relative humidity, it will be clear that $\Delta$ is directly proportional to the temperature T and to $(1-H)$. This assumption is not strictly true as shown by the full lines of Fig. 2 taken from actual readings but it can be readily seen that the deviations from the theoretical $\Delta$'s shown in dashed lines and actual readings as shown in full lines, is not excessively great except for very low humidities at rather high temperatures, conditions rarely encountered.

Figure 3:
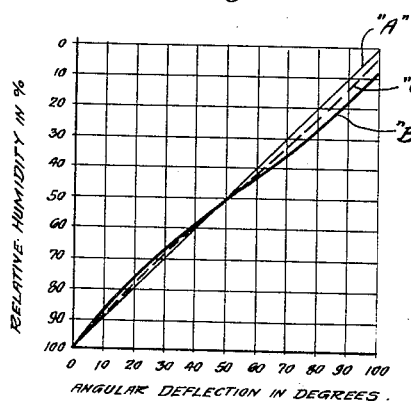
Figure 3 is a graphic illustration showing the slight percentage of error existent in employing a direct-reading indicator with a linear scale.

In Fig. 3, wherein the abscissa represents angular deflection in degrees and the ordinate percentage of relative humidity, the line A represents an angle of 45° which is the perfect correlation whereas the full line curve B depicts the error resulting by the employment of a direct-reading hygrometer with a linear scale as estimated from the graph of Fig. 2. The dotted line curve C of Fig. 3 shows a compromise calibration which gives greater accuracy over a wider range of temperatures and humidities though the error at low temperatures (approximately 0° C.) would be slightly increased.

From the foregoing the advantage in employing the relation $$\Delta_H = K\left(T + \frac{A}{B}\right)(1-H)$$

is believed to be obvious, since for a given humidity $\Delta$ appears to be directly proportional to temperature and yet for zero humidity $$\Delta_0 = K\left(T + \frac{A}{B}\right)$$

In order to employ a meter with a direct reading on a linear scale it therefore follows that the scale reading for a given humidity is the ratio $$\frac{\theta}{90°} = \Delta/K\left(T + \frac{A}{B}\right) = (1-H)$$

That is to say, that for 100% humidity the deflection of the meter or indicator must necessarily be zero while for zero humidity the deflection is a maximum. Accordingly in an accurate direct-reading hygrometer it is essential that the following requisites exist:

(1) A controlling or restraining force on the pointer of the indicator increasing linearly with temperature which follows from the formula $$K\left(T + \frac{A}{B}\right)$$

which compensates for the effect of temperature on the psychrometric difference for a given humidity and which will be hereinafter referred to as "controlling force."

(2) A deflecting force proportional to $$K\left(T + \frac{A}{B}\right)$$

when the wet bulb is at the same temperature as the dry bulb with forces (1) and (2) equal at all temperatures for 100% humidity so that the meter deflection is zero.

(3) A deflecting force proportional to $\Delta$ superimposed on the deflecting force of (2) and acting in the same direction as the latter which may be termed a "psychrometric force" added to the deflecting force (2) and in opposition to the "controlling force" that gives the reading on a linear scale of the relative humidity, with the sum of forces (2) and (3) being equal to force (1) at equilibrium.

Figure 4:
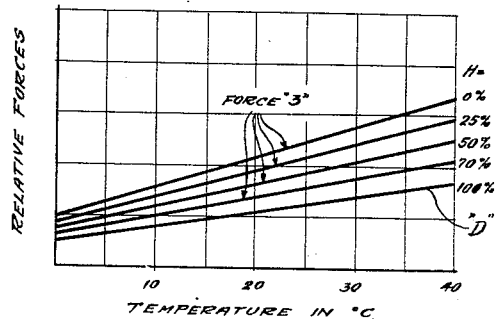
Figure 4 is a graphic illustration showing the relationship between the various forces utilized in the hygrometer of the present invention at various temperatures.

The relationship of these forces may be better appreciated from Fig. 4 wherein the abscissa represents temperature in degrees C. and the ordinate the relative forces for various humidities. Considering first the line D, this shows the relative magnitude of the deflecting force (2) and the controlling force (1) on the indicator for various temperatures from zero° to 40° C. at 100% humidity, while the remaining lines identified as "force 3," show the effect of this superimposed deflecting force (3) on the forces responsible for line D at humidities of less than 100% down to zero humidity.

The following is a table computed from the foregoing formula and showing the difference between the dry bulb and wet bulb temperatures for several humidities and temperatures confirming the data as graphically represented in Figs. 1 to 3:

| T. °C. | Relative Humidity, H. | | | | | | | | | | |
|---|---|---|---|---|---|---|---|---|---|---|---|
| | 0 | 10 | 20 | 30 | 40 | 50 | 60 | 70 | 80 | 90 | 100 |
| 40 | 25.3 | 21.4 | 17.94 | 15.00 | 12.15 | 9.65 | 7.45 | 5.35 | 3.45 | 1.75 | 0 |
| 35 | 22.3 | 19.0 | 16.1 | 13.45 | 11.05 | 8.85 | 6.82 | 4.95 | 3.15 | 1.58 | 0 |
| 30 | 19.4 | 16.75 | 14.25 | 12.00 | 9.90 | 8.00 | 6.15 | 4.50 | 2.90 | 1.40 | 0 |
| 25 | 16.65 | 14.50 | 12.55 | 10.60 | 8.70 | 7.10 | 5.50 | 4.05 | 2.55 | 1.28 | 0 |
| 20 | 14.10 | 12.35 | 10.70 | 9.15 | 7.65 | 6.20 | 4.87 | 3.50 | 2.32 | 1.13 | 0 |
| 15 | 11.70 | 10.35 | 9.00 | 7.75 | 6.50 | 5.30 | 4.16 | 3.07 | 2.00 | 0.99 | 0 |
| 10 | 9.55 | 8.48 | 7.42 | 6.40 | 5.38 | 4.40 | 3.55 | 2.54 | 1.63 | 0.925 | 0 |
| 5 | 7.50 | 6.75 | 5.94 | 5.18 | 4.40 | 3.63 | 2.88 | 2.15 | 1.41 | 0.70 | 0 |
| 0 | 5.73 | 5.10 | 4.50 | 3.90 | 3.34 | 2.75 | 2.15 | 1.62 | 1.10 | 0.55 | 0 |

Having described the requisites necessary to provide an accurate direct reading hygrometer operating on the psychrometric principle, the remaining figures of the drawings show several embodiments of the present invention in which the necessary forces are produced either electrically or mechanically.

Figure 6:
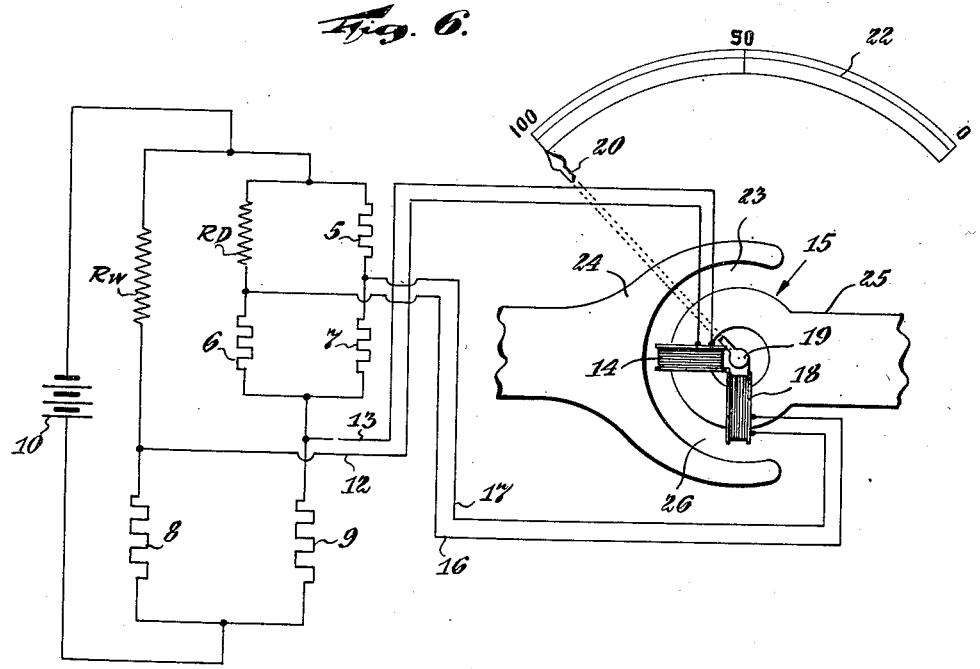
Figure 6 is a schematic drawing of the electrical arrangement of a hygrometer constructed in accordance with the present invention and showing the novel construction of a ratio meter employed therewith.

Referring now particularly to Fig. 6 a wet bulb resistance thermometer $R_w$ is shown having a suitable coefficient of resistance and forming one leg of a Wheatstone bridge while $R_d$ is a dry bulb resistance thermometer having a higher coefficient of resistance than $R_w$. Connected in a second Wheatstone bridge arrangement with dry bulb $R_d$ are resistances 5, 6 and 7 which are not responsive to temperature but all of which constitute a leg of the primary bridge, the latter including the wet bulb resistance $R_w$ as well as two inert resistances 8 and 9.

The junction of resistances 8 and 9 is connected to one side of a voltage source, such as a battery 10, while the junction of wet bulb resistance $R_w$ and the secondary bridge including the dry bulb resistance $R_d$, is connected to the other side of the source of voltage 10. A pair of conductors 12 and 13 connect the opposite points of the primary bridge to a winding 14 through torqueless springs (not shown) of a meter 15 while another pair of conductors 16 and 17 connect the remaining points of the secondary bridge to a further coil 18 of the meter 15.

As shown in Fig. 6 the meter coils 14 and 18 are secured to the same shaft 19 but at 90° with respect to each other and a pointer 20 is carried by the shaft 19 with the pointer registering the percentage of humidity on a scale 22. The meter coil or winding 14 moves in a gap 23 between magnetic pole pieces 24 and 25 in which the flux density is uniform due to a uniform spacing between the pole pieces 24 and 25 throughout their adjacent arcuate surfaces through which the coil 14 moves. On the other hand the coil 18 moves in a gap 26 in which the flux density increases in a clockwise direction inasmuch as the spacing between adjacent arcuate surfaces of the pole pieces 24 and 25 varies through which coil 18 moves.

In the operation of the apparatus of Fig. 6 the primary bridge is unbalanced at all temperatures due to the temperature coefficient of resistance of the secondary bridge being greater than that of resistance $R_w$. This condition holds true even when the temperature of the wet bulb is the same as that of the dry bulb (100% humidity) and they have the same resistance at only one temperature, namely, that corresponding to the hypothetical temperature calculated from the fundamental relation given above. Since $$\Delta = (A+BT)(1-H)$$

then if $$\Delta/(1-H) = O$$

it follows that $$(A+BT) = 0 \text{ and } T = -A/B$$

which latter is the hypothetical temperature at which the bridge is balanced.

Hence the primary bridge is unbalanced at all temperatures, except $-A/B$, with the result that a current flows through coil 14 at all times even when $R_w$ and $R_d$ are the same temperature. This produces a torque proportional to $(A+BT)$ which tends to deflect the pointer 20 in a clockwise direction. The secondary bridge is also unbalanced at all times causing a greater current to flow through winding 18 and producing a torque tending to move the pointer 20 in a counter-clockwise direction in opposition to the torque produced by the winding 14. The current through the winding 18 follows the same rule of proportionality to $(A+BT)$ and the values of the wet and dry bulb resistances and their respective temperature coefficients are so chosen as to produce such proportionality and when at the same temperature to cause the pointer 20 to rest at 100% relative humidity.

This results in the coil 18 being in the weakest part of the magnetic field in the gap 26 but when the temperature of $R_w$ becomes less than that of $R_d$, as when the humidity falls below 100%, the current through coil 14 increases thereby developing more torque with clockwise rotation of the pointer as well as that of coils 14 and 18. Such movement, however, causes the coil 18, in which the current has remained constant, to occupy a position in the magnetic field of gap 26 of such increased flux density that the torque developed by winding 18 equals the torque developed by coil 14, thus bringing the pointer 20 to rest on the scale 22 in registration with indicia indicating the relative humidity.

It can thus be seen that for any equilibrium position of the pointer 20 the torque developed by the two coils is equal and opposite even though the current flowing through the coils 14 and 18 is never the same except at the point at the end of the scale corresponding to zero humidity. Accordingly at any position of the pointer the torques developed in the two coils 14 and 18 would be dependent on the respective currents which are calculated from the above mentioned formula. For example, the current for winding 14 would be calculated by the torque relation:

$$K\left(T+\frac{A}{B}\right)(1+(1-H))$$

while the current for winding 18, never being the same as that for winding 14, would be proportional to $$\left(T+\frac{A}{B}\right)\left(\frac{F}{F'}\right)$$

in which F is the flux density in gap 23 and F' is the flux density in gap 26 for 100% humidity position of coil 18.

Figure 7:
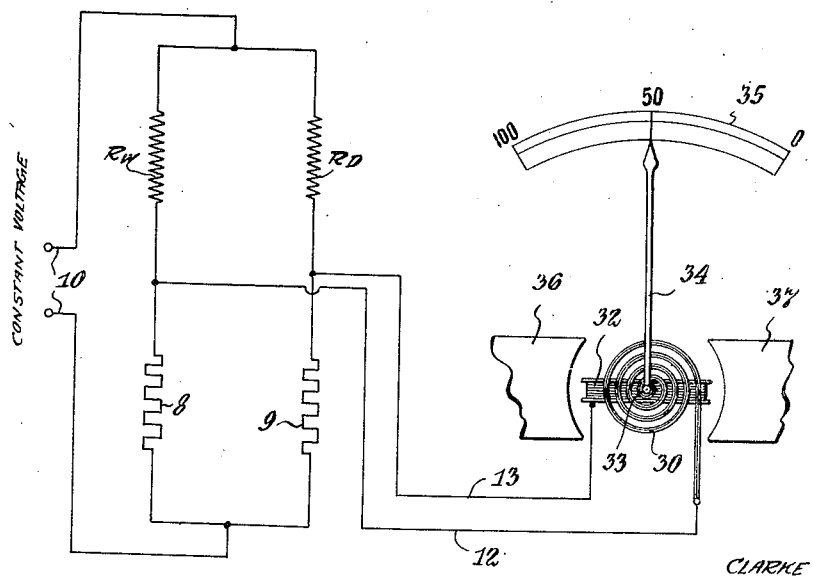
Figure 7 is a schematic drawing of a modification which the electrical circuit may take in the hygrometer of the present invention.

The modification of Fig. 7 differs slightly from that of Fig. 6 in that the secondary Wheatstone bridge arrangement has been dispensed with as well as one of the meter windings. In lieu of such winding a bimetallic hair-spring 30 is utilized. Again, however, the juncture of the fixed resistances 8 and 9 is connected to one side of the source of constant voltage 10 while the juncture between the wet bulb resistance $R_w$ and the dry bulb resistance $R_d$, which constitutes the other two legs of the Wheatstone bridge, is connected to the other side of the constant voltage source 10. The remaining points of the bridge are connected by conductors 12 and 13, respectively, to one end of the torqueless hair spring 30 and to one end of a meter winding or coil 32 carried by a shaft 33 thus connecting the spring 30 and coil 32 in electrical series relationship with the bridge arrangement. Also connected to the shaft 33 is a pointer 34 which registers with a scale 35 in the same manner as in the meter of Fig. 6.

As in Fig. 6, the resistances 8 and 9 are similar and fixed in that they have no coefficient of resistance, while the wet bulb resistance $R_w$ has a temperature coefficient of resistance $\alpha$ and the dry bulb has a suitably higher temperature coefficient of resistance $\beta$. The torqueless hairspring 30, which is anchored at the end to which the conductor 12 is secured, controls the movement of the coil 32 between the pole pieces 36 and 37 of the magnet and opposes the torque developed in the coil 32 when current flows through the latter due to the difference in resistance between $R_w$ and $R_d$.

Since the temperature coefficient of resistance of the dry bulb $R_d$, is greater than that of the wet bulb $R_w$, the bridge is unbalanced at all temperatures (even at 100% humidity) in the same manner as previously described relative to Fig. 6. As the ambient temperature increases the dry bulb $R_d$ increases in resistance faster than that of the wet bulb $R_w$ thus increasing the unbalanced condition of the bridge with more current flow through the coil 32. The torque accordingly developed in the coil likewise increases tending to move the pointer 34 more and more to the right as shown in Fig. 7. However, the opposing torque of the hair-spring 30 likewise increases at the same rate as the ambient temperature increases, with the result that the pointer 34 remains stationary at 100% humidity, as shown by line D in Fig. 4. When the humidity is less than 100% force (3) becomes operating and more torque is developed in the coil 32. This torque acting in a clockwise direction winds up the bimetal hair-spring 30 until the torque thereof equals the torque of coil 32. The two opposing torques are then in equilibrium and the position of the pointer indicates the relative humidity on the scale 35.

The relationship of the resistances $R_w$ and $R_d$, as well as the torque of the bimetallic hairspring, may be better appreciated when it is considered that at a temperature corresponding to $T=-A/B$ both the wet bulb and the dry bulb have the same resistance R, in the same manner as described relative to the current flowing through the windings 14 and 18 of Fig. 6 for the "hypothetical" temperature, but at any other temperature $$R_w=R\left[1+\alpha\left(T+\frac{A}{B}\right)\right]$$

while $$R_d=R\left[1+\beta\left(T+\frac{A}{B}\right)\right]$$

For any condition of temperature or humidity the torque developed in the coil 32, which is proportional to current, is proportional to:

$$R\left[(\beta-\alpha)\left(T+\frac{A}{B}\right)+\alpha(A+BT)(1-H)\right]$$

while the torque of bimetallic hair-spring 30 is given by the relation $$K\left(T+\frac{A}{B}\right)(1+(1-H))$$

In Figs. 6 and 7 I have shown the hygrometer of the present invention as being electrically operated since the requisite forces are created by the flow of current through two separate coils as in Fig. 6 or the employment of current flow through a coil to create a force in opposition to that of a bimetallic hair-spring as in Fig. 7. Since, as previously mentioned, the hygrometer of the present invention depends for its operation on forces which are proportional and opposite such forces may be readily produced mechanically as well as electrically.

Figures 8, 9:
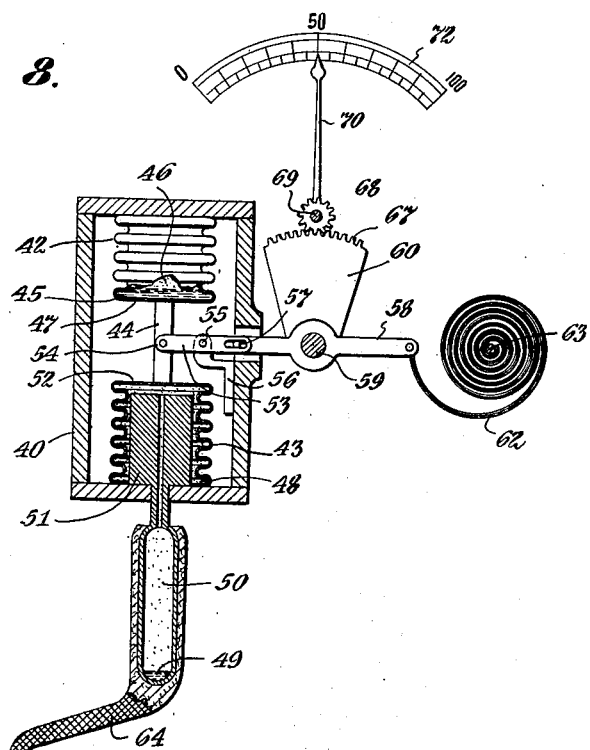
Figure 8 is an elevational view of a mechanical form which the hygrometer of the present invention may take.
Figure 9 is an elevational view of a modification which the mechanical form of the hygrometer of the present invention may take.

By reference now more particularly to Fig. 8 one mechanical form of a direct-reading hygrometer of the present invention is shown comprising a housing 40 encasing an upper expansible bellows 42 and a lower similar bellows 43 having their opposite ends interconnected by a shaft 44 while their remaining ends bear against opposite walls of the housing 40. The upper bellows 42 contains a volatile liquid 45 and its vapor 46 which exerts a pressure tending to push the lower plate 47 in a downward direction.

The lower bellows 43 likewise contains a vapor 48 of a volatile liquid 49 contained in a tube 50 which communicates with the interior of the bellows 43, the volume of which is decreased by a solid material 51, so that the vapor 48 therein exerts a pressure tending to push the bellows plate 52 in an upward direction in opposition to the force exerted by upper bellows plate 47 through shaft 44. A lever arm 53 is pivotally connected at 54 to the shaft 44 and such lever arm is arranged to rotate about a pivot 55 carried by a housing bracket 56. The remaining end of the lever arm 53 is loosely linked at 57 to a second lever arm 58 pivoted to a shaft 59 and carrying a quadrant 60 while the free end of the second lever arm 58 is connected to a bimetallic spiral 62 in turn pivoted at 63.

The relative forces shown in Fig. 4 are all based on the assumption that the forces increase with temperature according to the relation $$\left(T+\frac{A}{B}\right)$$

Figure 5:
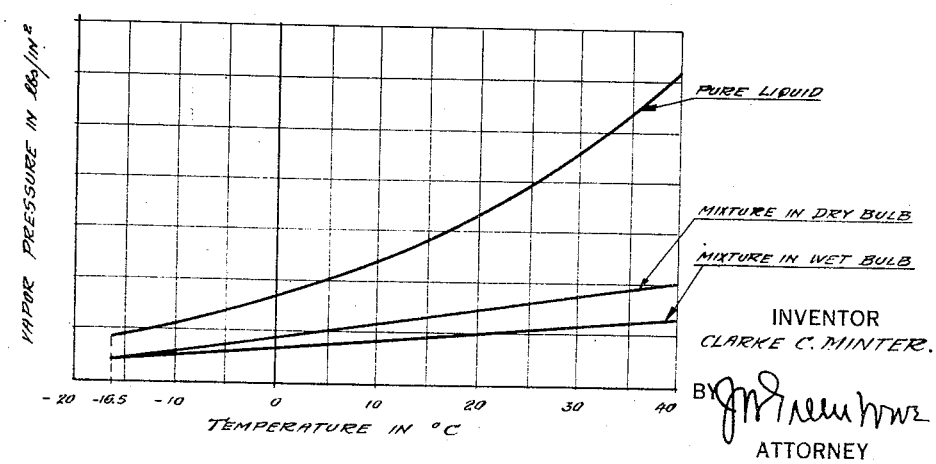
Figure 5 is a graphic illustration showing the relationship between the mixture in the wet and dry bulb at various temperatures and the vapor pressure of the mixtures at such temperatures.

It is accordingly obvious that the volatile liquid 45 in the bellows 42 cannot be a pure liquid since the vapor pressure of a pure liquid would vary in an unsuitable manner as shown by the upper curve of Fig. 5. In order that the vapor pressure of the liquid 45 in the bellows 42 increase with temperature in a linear manner, as shown by the "mixture of dry bulb" curve of Fig. 5, it is necessary to use a mixture consisting of a volatile liquid dissolved in a non-volatile liquid and the volume of the liquid mixture must be small compared with the volume of the vapor space.

If these conditions are fulfilled it follows that as the temperature increases more of the volatile liquid has to evaporate from the solution with the result that the concentration of the volatile component in the liquid decreases and its vapor pressure does not increase with temperature as rapidly as that of the volatile component in the pure state. Accordingly, by properly proportioning the volume of the vapor space, the mole fraction of the volatile component and the total volume of the mixture, the desired linear vapor pressure curves for the liquids in the wet and dry bulbs can be obtained as shown in Fig. 5.

It is also necessary that the two liquids be miscible and that they obey Raoult's law; conditions which can be met by selecting two components which are chemically related. As an example, if octyl-chloride, which boils at 183° C., is taken as the non-volatile component and methyl-chloride ($CH_3Cl$), which boils at $-24°$ C., is selected as the volatile component, then the linear variations in vapor pressure can be obtained for the two components as required to give the wet and dry bulb curves of Fig. 5.

Still further mixtures meeting the above conditions and comprising a mixture of a non-volatile liquid and a highly volatile liquid, are some of the hydrocarbons, such as ethane boiling at $-88°$ C. and decane boiling at 174° C. which can be employed. It might also be mentioned that if the vapors of the volatile component do not obey the simple gas laws, i. e., expand linearly with increasing temperature, no appreciable error is introduced since the same vapor is in both the wet and dry bulbs or bellows 42 and 43 and it is only the difference in pressure of the two vapors with which one is here concerned.

The manner in which the exact quantities of both the volatile component and non-volatile component required in the liquid mixtures 45 and 49, to obtain the linear pressure-temperature curves as shown in Fig. 5, are properly calculated may be better understood from the following:

According to Raoult's law, the vapor pressure of the volatile component of such a mixture is proportional to the mole fraction of the volatile component in the mixture multiplied by the vapor pressure of the volatile component in the pure state. That is:

(1)
$$P_g = \frac{n}{1+n} P_t$$

where $P_t$ is the vapor pressure of the pure volatile component at the temperature T, and the mixture contains 1 mole of the non-volatile component and $n$ moles of the volatile component. Equation 1 holds only when the volume of the liquid is large compared with the volume V of the vapor space above the liquid. When the volume of the vapor space is large compared with that of the liquid the evaporation of sufficient vapor to fill the space V results in a reduced concentration of the volatile component in the liquid, with the result that the vapor pressure of the volatile component in the mixture decreases as vaporization goes to equilibrium.

It can thus be seen that with a small volume of the solution in the bellows 42 and 43, the concentrations or mole fractions $(n/(n+1))$ will decrease as the temperature increases, with the net result that the vapor pressure of the volatile component in the mixture will increase more slowly with temperature than if the volatile component were in the pure state, or if the volume of the vapor space were small compared to the volume of the mixture. Taking first the liquid 45 in the upper bellows 42 of Fig. 8 and assume it is desired to have a linear variation of vapor pressure in the bellows 42 as the temperature is increased, and the vapor pressure follows the relation:

(2)
$$P_d = P_0[1 + \beta(16.5° + T)]$$

Equation 2 gives the vapor pressure of the liquid phase and according to the gas laws the pressure in the vapor phase must be:

(3)
$$P_g = \frac{Kng(273+T)}{V}$$

in which $ng$ is the number of moles of vapor in the vapor phase contained in the volume V, and K is a constant.

At equilibrium (2) and (3) must be equal, or (4)
$$\frac{Kng(273+T)}{V} = P_0[1 + \beta(16.5° + T)]$$

Solving for $ng$ we obtain as the number of moles in the vapor phase (5)
$$ng = \frac{P_0 V}{K}\left[\frac{1 + \beta(16.5° + T)}{273 + T}\right]$$

Equation 5 gives the number of moles $ng$ in the vapor phase at any temperature. At $-16.5°$ C. (see Fig. 5) the number of moles in the vapor phase would be (6)
$$ng_0 = \frac{P_0 V}{256.5 K}$$

If there were $n_0$ moles in the mixture at $-16.5°$ C., then the mole fraction at $-16.5°$ C. would be $n_0/(n_0+1)$. In going from $-16.5°$ C. to a temperature T the number of moles evaporated from the mixture would be equal to the increase in the number of moles in the vapor phase, and would be equal to the difference between (5) and (6), which is:

(7)
$$n_g - n_{g0} = \frac{P_0 V}{K}\left[\frac{1 + \beta(16.5° + T)}{273 + T} - .0039\right]$$

The moles in solution at any temperature would be $n_0$ minus (7), and the mole fraction would be (8)
$$\frac{n_0 - \frac{P_0 V}{K}\left[\frac{1+\beta(16.5°+T)}{273+T} - .0039\right]}{1 + \left(n_0 - \frac{P_0 V}{K}\left[\frac{1+\beta(16.5°+T)}{273+T} - .0039\right]\right)}$$

Combining (1), (2) and (8), we have, after reducing and solving for $n_0$, (9)
$$n_0 = \frac{P_0 V}{K}\left(\frac{P_d}{273+T} - .0039\right) + \frac{P_d}{P_t - P_d}$$

$P_t$ and $P_d$ can be taken direct from the graph of Fig. 5.

If the P's in (9) are expressed in atmosphere, then K must be in liter-atm. (.08205). The volume of the vapor space V will then have to be expressed in liters in order to obtain $n_0$ in moles. For a given value of $P_0$, only one particular value of V will give the same value for $n_0$ as $P_t$ and $P_d$ are varied. $n_0$ and V are therefore closely linked with the equation for $P_d$. Also $n_0$ and V are dependent on the assumed value of $\beta$ in (2).

Although the above equations have been directed to the manner of computing the liquid mixture 45 suitable for the bellows 42, it is believed obvious that they apply equally to the wet bulb or liquid 49 for the bellows 43 of Fig. 8, and the vapor pressure of the liquid will vary with temperature as shown by the lower curve of Fig. 5.

Having computed the liquid and vapor pressures in the above manner, the liquid 45 in bellows 42 is given a higher vapor pressure than that of the liquid 49 communicating with the lower bellows 43, as shown in Fig. 5 so that when these two liquids 45 and 49 are at the same temperature (as would be the case for 100% humidity) the vapor 46 in bellows 42 exerts a greater pressure on end plate 47 than the vapor 48 exerts on end plate 52 of the lower bellows 43 which would cause downward movement of pivot 54 with counter-clockwise rotation of lever arm 53 and attendant clockwise rotation of lever arm 58, if the latter were not restrained by an equal force exerted upward at the other end of lever arm 58 by the bimetallic spiral 62.

The force thus exerted by the bimetallic spiral 62 is the controlling force which varies with the temperature according to the formula $$K\left(T+\frac{A}{B}\right)$$

while the force due to the difference in vapor pressure in the bellows 42 and in the bellows 43 is the deflecting force proportional to $$K\left(T+\frac{A}{B}\right)$$

so that at 100% humidity the force exerted by the difference between the vapor pressures of 46 and 48 is equal to that exerted by the bimetallic spiral 62, as shown by the curve D in Fig. 4. Again referring to Fig. 8 it will be noted that the volatile liquid 49 is surrounded by a wick or the like 64 which is wetted by a liquid such as distilled water 65 contained in a reservoir 66.

When the relative humidity of the atmosphere surrounding the wick 64 is less than 100% the wick being wetted by the distilled water is at a lower temperature than the surrounding air. This accordingly lowers the temperature of the volatile liquid 49 within the tube 50 which is surrounded by the wick 64 causing the pressure of the vapor 48 within the bellows 43 to decrease with attendant decrease in the upward pressure on the bellows end plate 52. The force exerted by the vapor pressure 46 within bellows 42 thus predominates and causes downward movement of pivot 54 together with counter-clockwise rotation of lever arm 53 about its pivot 55 and attendant clockwise rotation of lever arm 58 about the shaft 59 and against the opposing force exerted by the bimetallic spiral 62 until the latter increases in tension and becomes equal to that exerted by the difference in vapor pressure within the bellows 42 and 43.

Since the quadrant 60 is provided with a toothed rack 67 meshing with a gear 68 rotatable about a shaft 69 and the gear carries a pointer 70, the latter moves to the left, as shown in Fig. 8, to a new position on a scale 72 calibrated in terms of relative humidity. Thus it will again be seen that the apparatus as shown in Fig. 8 employs the same three forces as previously described in connection with the preceding figures which forces are produced mechanically instead of electrically but they nevertheless follow the formula above mentioned.

When the humidity is less than 100% any movement of the bellows in Fig. 8 will decrease the volume of the vapor space in the bellows 43 and increase the vapor space in the bellows 42. This will cause an increase in the concentration of the volatile component in the mixture 49, and a decrease in the concentration of the volatile component in the mixture 45. This would tend to decrease the pressure difference and introduce an error, which is not large in any case, but which can be kept to a minimum by having the total volume of the vapor space as large as possible and the diameter of the bellows as small as possible.

Since any movement of the bellows 42 and 43 requires a certain force to overcome the natural spring action of the bellows, which is independent of temperature, as well as the spring action of the bimetallic spiral 62 which increases with temperature, it is obvious that at low temperatures the spring action of the bellows 42 and 43 for a given movement would form a higher percentage of the total spring action, and an error would result from this cause. However, this error can be eliminated by setting the bimetallic spiral 62 to start its action at some temperature higher than $$T=\frac{-A}{B}$$

the exact point depending on the magnitude of the spring action of the bellows 42 and 43.

The modification of Fig. 9 in principle is similar to that of Fig. 8 but the various above mentioned forces are produced by diaphragms in lieu of expansible bellows. For example, a diaphragm 75 is formed of an evacuation tube 76 and a wet bulb 77 containing a volatile liquid 78 and rigidly held in place by an adjustable set screw 79 passing through a post 80 attached to the casing (not shown) for the apparatus. A similar diaphragm 82 is also formed with an evacuation tube 83 and a dry bulb 84 provided with a volatile liquid 85, being also rigidly held in place by an adjustable set screw 86 attached to a post 87 forming part of the casing, in the same manner as the post 80.

A rigid bar 88 positioned between the two diaphragms 75 and 82 keeps the spacing therebetween constant and such spacing is regulated by the adjustable set screws 79 and 86 in the respective posts 80 and 87.

A pin 89 is carried by the rod or bar 88 which engages a bifurcated portion of a sector 90 pivoted to a shaft 92. This sector engages a pinion gear 93 carrying a pointer 94 registering with a scale 95, in the same manner as above described relative to Fig. 8. A second pin 96 is also carried by the rod 88 which is contacted by a strip 97, of heat responsive material such as bimetal, adjustably secured by set screws 98 to a supporting block 99, the latter of which is adjustably secured as by a set screw 100 to a post 102 forming part of the casing (not shown).

An increase in temperature tends to cause the bimetallic strip 97 to deflect from left to right as shown in Fig. 9, but it is restrained by the pin 96 carried by bar 88. Consequently as the temperature increases and when both the wet bulb 77 and dry bulb 84 are at the same temperature (100% relative humidity), the vapor pressure in diaphragm 82 must be greater than the vapor pressure in diaphragm 75 by an amount equal to the force exerted on the rod 88 by the bimetallic strip 97. It therefore follows that the vapor pressure of the liquid 85 in bulb 84 must be greater than that of the liquid 78 in bulb 77 and that the vapor pressures will be the same at only one temperature, namely, $$T = \frac{-A}{B}$$

as above described relative to the vapor pressure in the respective bellows 42 and 43.

At all other temperatures the vapor pressure of the volatile liquid 85 within the dry bulb will be greater than the vapor pressure of the liquid 78 in the wet bulb 77 but such difference will remain proportional to $$T + \frac{A}{B}$$

This means that the difference will increase at the same rate, when the liquids are at the same temperature for 100% relative humidity, as the restraining pressure exerted by the bimetallic strip 97 on bar 88 resulting in the bar remaining stationary even with changes in temperature at 100% relative humidity. However, when the humidity becomes less than 100% the liquid 78 will be at a lower temperature than that of the liquid 85 and the difference in vapor pressure therebetween will increase.

In the same manner as above described relative to Fig. 8, the opposing force of bimetallic strip 97 then becomes less than the difference in vapor pressure between the diaphragms 75 and 82 with the result that the bar 88 will then move from right to left, as viewed in Fig. 9, against the spring action exerted by the bimetallic strip.

As soon as the spring action of the bimetallic strip 97 is sufficiently great to balance the force on the bar 88 due to the difference in vapor pressure in diaphragms 75 and 82 equilibrium will be reached and the pointer 94 which rotates upon movement of bar 88 will indicate on the scale 95 the relative humidity.

From the foregoing it will become obvious to those skilled in the art that a direct-reading hygrometer has been herein provided which is operable on the psychrometric principle. Moreover, the necessity for charts and tables has been eliminated by the construction of a hygrometer employing varying forces mathematically calculated so as to give the correct proportion under all conditions from zero to 100% relative humidity which results in an accurate meter indication under all conditions. These forces can be produced either electrically or mechanically and are responsive to temperature changes so that by utilization of a ratio meter they are converted in terms of relative humidity on the meter scale.

Although several embodiments of the present invention have been shown and described, it is to be understood that other modifications thereof may be made without departing from the spirit and scope of the appended claims.

I claim:

1. A direct-reading psychrometric hygrometer comprising a meter for registering the relative humidity, means operable to subject the movement of said meter to a deflecting force tending to cause the movement of said meter to move in one direction including a "dry" temperature responsive element and a "wet" temperature responsive element having a lower temperature coefficient of response, and a "dry" temperature responsive means operable to subject said meter movement to a deflecting force in an opposite direction.

2. A direct-reading psychrometric hygrometer comprising a meter for registering the relative humidity, means operable to subject the movement of said meter to a deflecting force tending to cause the movement of said meter to move in one direction including a "dry" temperature responsive element and a "wet" temperature responsive element having a suitably lower temperature coefficient of response such that when at the same temperature as said "dry" temperature responsive element the magnitude of said force increases with temperature according to the relation $$\left(T + \frac{A}{B}\right)$$

wherein T equals temperature in degrees centigrade; A equals 5.8, and B equals 0.345; and a "dry" temperature responsive means operable to subject said meter movement to an oppositely directed force increasing with temperature, according to the same relation $$\left(T + \frac{A}{B}\right)$$

3. A direct-reading psychrometric hygrometer comprising a meter for registering the relative humidity, means operable to subject the movement of said meter to a deflecting force tending to cause the movement of said meter to move in one direction including a "dry" temperature responsive element and a "wet" temperature responsive element having a suitably lower temperature coefficient of response such that when the relative humidity is 100% said force increases with temperature according to the relation $$\left(T + \frac{A}{B}\right)$$

wherein T equals temperature in degrees centigrade, A equals 5.8, and B equals 0.345; and a "dry" temperature responsive means operable to subject said meter movement to an oppositely directed force increasing with temperature according to the same relation $$\left(T + \frac{A}{B}\right)$$

4. A direct-reading psychrometric hygrometer comprising means for producing a directed force including a "dry" temperature responsive element, means for producing an oppositely directed force including a "dry" temperature responsive element and a "wet" temperature responsive element having a suitably lower temperature coefficient of response such that when the relative humidity is 100% the said oppositely directed force increases with temperature at the same rate as said first mentioned force, means for bringing the two said forces in opposition to each other, and means for indicating when the two said forces are in equilibrium including a movable pointer and a dial having a scale calibrated from 0% to 100% relative humidity.

5. A direct-reading psychrometric hygrometer comprising a meter subject to a plurality of forces for registering relative humidity, electrical means operable to subject the movement of said meter to a deflecting force tending to cause the movement of said meter to move in one direction including a "dry" temperature responsive element and a "wet" temperature responsive element having a lower temperature coefficient of response such that said deflecting force actually applied to said meter movement varies linearly with temperature and is proportional to the psychrometric difference between the temperature of the "dry" and "wet" temperature responsive elements, and electrical means including said "dry" temperature responsive element operable to subject said meter movement to a deflecting force in the opposite direction until such opposing forces reach equilibrium and said meter registers the relative humidity.

6. A direct-reading psychrometric hygrometer comprising a meter subject to a plurality of forces for registering relative humidity, electrical means operable to subject the movement of said meter to a deflecting force tending to cause the movement of said meter to move in one direction including a "dry" temperature responsive element and a "wet" temperature responsive element having a lower temperature coefficient of response such that said deflecting force actually applied to said meter movement varies linearly with temperature and is proportional to the psychrometric difference between the temperature of the "dry" and "wet" temperature responsive elements, and a "dry" temperature responsive means operable to subject said meter movement to a deflecting force in the opposite direction until such opposing forces reach equilibrium and said meter registers relative humidity.

7. A direct-reading psychrometric hygrometer comprising a meter subjected to a plurality of forces for registering relative humidity, means operable to subject the movement of said meter to a deflecting force tending to cause the movement of said meter to move in one direction including a pair of pressure elements comprising a "wet" bulb and a "dry" bulb having a difference in pressure therebetween which difference varies with temperature according to the relation $$\left(T + \frac{A}{B}\right)$$

wherein T equals temperature in degrees centigrade, A equals 5.8, and B equals 0.345; and a member operable to subject said meter movement to a deflecting force in the opposite direction until such opposing forces reach equilibrium and said meter registers relative humidity.

8. A direct-reading psychrometric hygrometer comprising a meter subjected to a plurality of forces for registering relative humidity, means operable to subject the movement of said meter to a deflecting force tending to cause the movement of said meter to move in one direction including a pair of pressure elements responsive to a "dry" bulb and a "wet" bulb having a difference in pressure therebetween which difference varies with temperature according to the relation $$\left(T + \frac{A}{B}\right)$$

wherein T equals temperature in degrees centigrade, A equals 5.8, and B equals 0.345; a pivoted member included in said meter movement and operable about its pivot in response to said deflecting force, and a temperature responsive member operable to subject said meter movement to a deflecting force in an opposite direction by causing rotation of said pivoted member until the resultant opposing forces reach equilibrium and said meter registers relative humidity.

9. A hygrometer comprising a meter subject to a plurality of forces provided with a pair of coils for registering the relative humidity, an electrical circuit including a primary Wheatstone bridge provided with a wet temperature responsive element in one leg thereof and having a diagonal bridge connected to a coil of said meter tending to cause movement of said meter in one direction in response to variations of said element upon the flow of electrical energy in said circuit, a secondary Wheatstone bridge constituting one leg of said primary bridge, a dry temperature responsive element in one leg of said secondary bridge and a diagonal of said secondary bridge connected to another coil of said meter to cause movement of said meter in an opposite direction upon the flow of electrical energy through said latter coil.

CLARKE C. MINTER.

REFERENCES CITED

The following references are of record in the file of this patent:

UNITED STATES PATENTS

| Number | Name | Date |
| --- | --- | --- |
| 1,098,472 | Bristol | June 2, 1914 |
| 1,169,617 | Comfort | Jan. 25, 1916 |
| 1,956,386 | Gruss | Apr. 24, 1934 |
| 1,984,341 | Grebe et al. | Dec. 11, 1934 |